United States Patent [19]
Pignatelli

[11] 3,799,658
[45] Mar. 26, 1974

[54] OSCILLATORY MIRROR DEVICE

[76] Inventor: Frank C. Pignatelli, 14 N. Meadow Rd., Old Saybrook, Conn. 06475

[22] Filed: June 14, 1972

[21] Appl. No.: 262,506

[52] U.S. Cl. ................................. 350/289, 350/7
[51] Int. Cl. ............................................ G02b 5/08
[58] Field of Search .......... 350/6, 7, 285, 289, 304, 350/307; 74/501 M

[56] References Cited
UNITED STATES PATENTS

| | | | |
|---|---|---|---|
| 3,063,342 | 11/1962 | Zeek | 350/6 |
| 2,854,892 | 10/1958 | Stark | 350/307 |
| 3,060,755 | 10/1962 | De Brosse | 350/6 |
| 3,549,243 | 11/1968 | Horwitt et al. | 350/289 |
| 3,575,496 | 4/1971 | Pollock | 350/289 |
| 3,596,079 | 7/1971 | Clark | 350/6 |

Primary Examiner—Ronald L. Wibert
Assistant Examiner—Michael J. Tokar

[57] ABSTRACT

A device adapted for mounting upon the body of a vehicle has a mirror which is supported for oscillation about a generally vertical axis. The mirror is motor driven to oscillate relatively slowly to provide a scanning action, thus broadening the field of vision beyond that afforded by a stationary mirror and thereby eliminating blind spots which would otherwise exist. The motor is disposed in the base with its drive shaft parallel to the axis of pivotal movement of a pivotable post supporting the mirror and a crank and link assembly interconnects the motor shaft and pivotable post to produce limited oscillatory movement of the mirror assembly to an arc of less than about 90 degrees on a continuous basis.

4 Claims, 5 Drawing Figures

PATENTED MAR 26 1974 3,799,658

OSCILLATORY MIRROR DEVICE

BACKGROUND OF THE INVENTION

Drivers frequently find it necessary to observe traffic conditions behind their vehicles without diverting their primary attention from a forward direction. Although the ability to do so has long been afforded by the use of rear-view mirrors mounted on the vehicle, portions of the vehicle frequently obstruct vision, resulting in blind spots or areas from which the driver's sight is partially or completely blocked. Due to the fast pace of modern-day traffic, the inability to readily obtain a broad, unobstructed view of traffic in the vicinity of the vehicle is most hazardous and is frequently the cause of accidental collisions, and the problem is especially serious with respect to trucks, buses, and other commercial vehicles which present relatively large areas of restricted vision.

Accordingly, it is the primary object of the present invention to provide a novel mirror device which affords a broadened field of vision.

It is a more specific object of the invention to provide such a device which is adapted for mounting upon a vehicle to oscillate about a generally vertical axis so as to provide a broadened field of vision in a generally rearward direction.

Another object of the invention is to provide a device of the foregoing type which is relatively simple and inexpensive to manufacture, and which operates in a convenient and highly effective manner.

SUMMARY OF THE INVENTION

It has now been found that the foregoing and related objects of the present invention are readily attained in an oscillatory mirror device comprising, in combination, a supporting base, a mirror assembly mounted thereon, an electric motor providing drive power, and drive train means. The mirror assembly is mounted upon the base for pivotal movement about an axis, and the drive train means is adapted to transmit power from the motor to the mirror assembly and to convert rotary movement from the motor to oscillatory movement of the mirror assembly. The mirror assembly is constrained to oscillation through an arc of less than about 90° about its axis of pivotal movement so as to scan a limited field of vision during operation of the device.

Normally, the drive shaft of the motor will extend parallel to the axis of pivotal movement of the mirror assembly. In preferred embodiments of the invention, the mirror assembly includes a mirror supported upon a pivotable post which extends along the pivotal axis thereof, and the drive train means comprises a crank and a link member. In such embodiments, the crank is secured to the motor shaft and has engagement means spaced radially from the axis of rotation thereof. The link member is fixedly secured to the post of the mirror assembly and has an elongated slot therein in which the engagement member of the crank is engaged. The slot is dimensioned and configured to constrain the engagement member to sliding movement along the axis thereof, and thereby to produce oscillatory movement.

The motor employed in the device appropriately rotates at a speed of about 15 to 20 revolutions per minute, and most desirably the base of the device will have a chamber formed therein in which the motor is housed. Generally, the device will additionally include a mounting bracket which is adapted for affixation to a vehicle body with the pivotal axis of the mirror assembly disposed in a substantially vertical attitude.

DETAILED DESCRIPTION OF THE ILLUSTRATED EMBODIMENT

Figure 1:
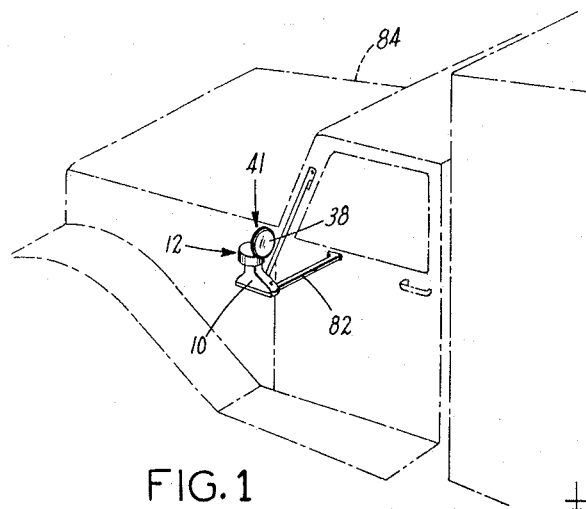
FIG. 1 is a perspective view of an oscillatory mirror device embodying the present invention mounted upon the cab of a truck body, which is illustrated in phantom line.

Turning now in detail to the appended drawing, therein illustrated is an oscillatory mirror device embodying the present invention and consisting of a shoe-shaped hollow base 10 having supported thereon a circular housing, generally designated by the numeral 12. The housing 12 consists of a cup-shaped, upwardly opening bottom portion 14 and an interfitting cover 16 engaged thereover. The cover 16 and bottom portion 14 are secured together by a pair of screws 18 engaged through the sidewalls thereof, and the housing 12 is affixed on the top wall 51 of the base 10 by a pair of fasteners 20 extending downwardly through the end wall 53 of the portion 14. The cover 16 has adjacent its edge a depending reinforcing boss 22, through which extends a circular passageway 24.

An upstanding mirror mount, generally designated by the numeral 26, is supported upon the cover 16 in alignment over the passageway 24. The mount 26 consists of a tubular spine 28 and a forward mounting plate 30 which extends axially along one side and to which is affixed a mounting cup 32. The spine 28 has a passageway 34 extending axially therethrough in which is fixedly engaged a pivot post 36.

Figure 3:
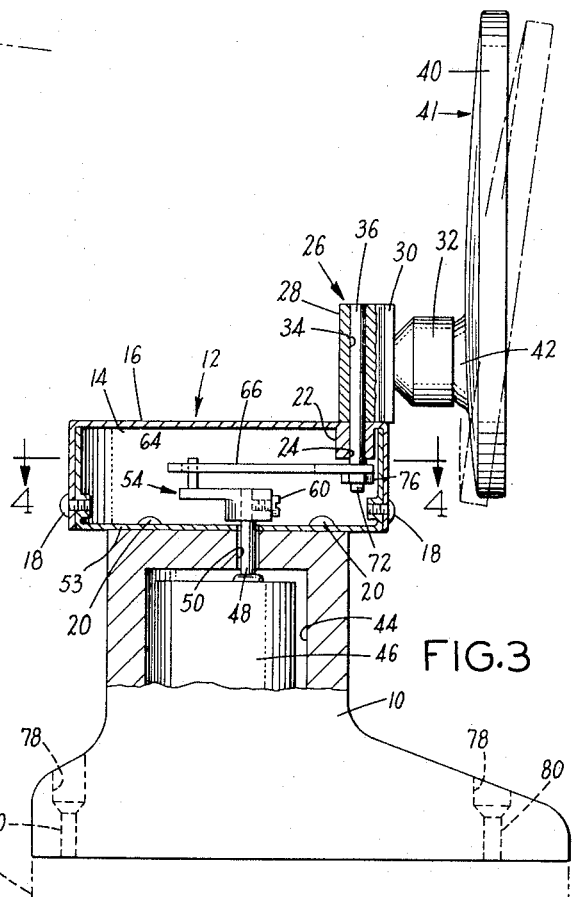
FIG. 3 is a side elevational view of the mirror device in partial section along line 3—3 of FIG. 2, drawn to a greatly enlarged scale and showing in phantom line the mirror at a downwardly tilted attitude.

As is seen in FIG. 1, a disk-shaped mirror element 38 is supported within the frame or shell 40 of the mirror assembly, generally designated by the numeral 41. The frame 40 has a protruding mounting portion 42 which is engaged within the mounting cup 32 by conventional means permitting, as indicated in FIG. 3, adjustment of the frame 40 about a horizontal axis to achieve the most advantageous angular attitude.

The base 10 has an upwardly extending chamber 44 found therein in which is housed an electric motor 46. The motor 46 has an upstanding drive shaft 48 of generally circular cross section, which projects outwardly through the passageway 50 and has a notched outer end portion 52. A crank, generally designated by the numeral 54, is engaged on the shaft 48, and has a circular hub 56 with a "half-round" aperture 58 extending therethrough. The cross sectional configuration of the aperture 58 corresponds to that of the outer end portion 52 of the shaft 48 so as to prevent rotation of the crank 54 relative thereto, with the radially inserted screw 60 preventing the inadvertent disassembly thereof. An arm portion 62 extends radially from the hub 56 and supports an upstanding pin 64 adjacent its outer end.

At its lower end, the shaft 36 of the mount 26 has a threaded tip portion 72 and an adjacent squared portion 74 of short axial length. The shaft 36 passes downwardly through the aperture 24 in the cover 16 and has its squared portion 74 engaged in the square aperture 70 adjacent one end of the elongated link 66, which is secured thereon by threaded engagement of the nut 76 on the threaded portion 72. Adjacent its other end the link 66 has an elongated slot 68 in which is slidably engaged the upstanding pin 64 of the crank 54.

Figure 5:
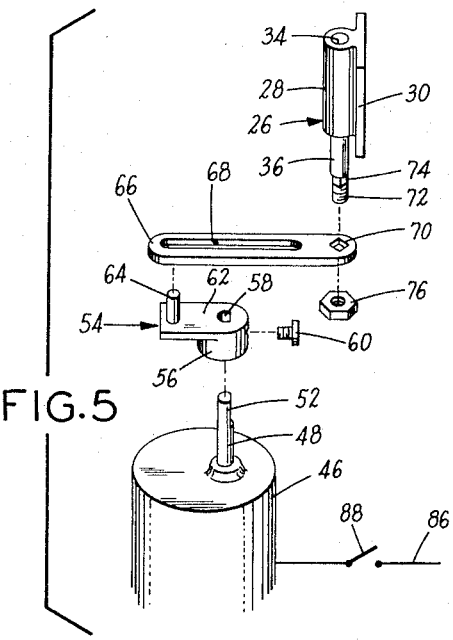
FIG. 5 is an exploded perspective view of the drive mechanism shown in FIG. 3.

The base 10 has a pair of countersunk holes 78 near its ends, in which are received screws 80 to fasten the base 10 to the bracket 82. The bracket 82 is, in turn, fastened to the door of a truck body cab 84 and extends outwardly therefrom to position the mirror assembly 41 for optimum visibility. As suggested schematically in FIG. 5, the wire 86 providing electrical connection to the motor 46 has a switch 88 therein for on-off control, and it will be appreciated that one end of the line 86 will normally be connected to the battery (not illustrated) of the vehicle with the circuit being completed by grounding in the usual way.

Figure 2:
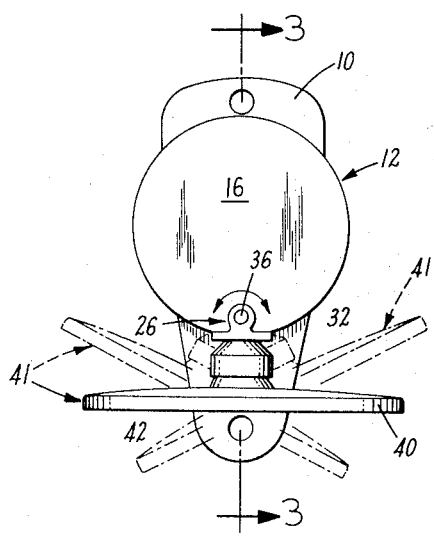
FIG. 2 is a plan view of the mirror device of FIG. 1, drawn to an enlarged scale and showing in phantom line the extreme positions of the mirror during its cycle of oscillation.
Figure 4:
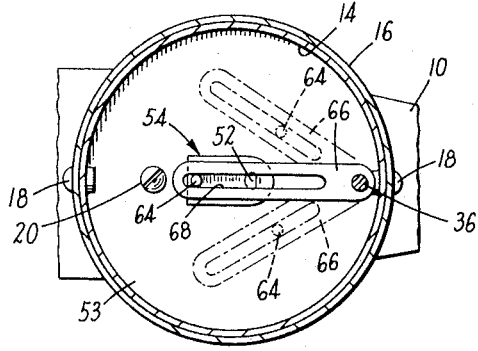
FIG. 4 is a fragmentary cross sectional view of the device along line 4—4 of FIG. 3 showing in phantom line the positions of the drive train corresponding to the extreme positions of the mirror.

Operation of the device will be readily apparent, and is initiated by closing of the switch 88 to energize the motor 46. Rotation of the shaft 48 causes the upstanding pin 64 to circumscribe a path thereabout; because the pin 64 is guided in the slot 68 and is thereby constrained to axial movement with respect to the link 66, such rotation oscillates the link 66 and in turn the mirror assembly 41 through the mount 26. The extreme positions of the mirror assembly 41 during its cycle of oscillation are illustrated in FIG. 2, and the corresponding positions of the drive train (i.e., the link 66 and crank 54) are shown in FIG. 4.

It will be appreciated that, although the illustrated embodiment is preferred, the configuration of the base, the mounting means for the mirror assembly, and the drive train mechanism employed may vary considerably without departure from the concept of the invention. Generally, the mirror assembly will utilize a conventional planar element; however, the convex mirrors which are preferred under some circumstances may also be employed, albeit with some level of distortion and usually with little added benefit. As shown in the drawing, it is desirable to mount the mirror in such a manner that it is adjustable about a horizontal axis (and preferably also about a vertical axis) to permit aiming to encompass the most extensive and significant field. The means by which the mirror assembly may be so mounted is quite conventional and may include ball and socket type fittings, or the like.

Although the illustrated drive train mechanism is highly desirable from the standpoint of simplicity and efficiency of operation, appropriate modifications will be readily apparent to those skilled in the art. The electric motor and line switch may similarly be of any suitable type, and may be such as to permit speed variations to accommodate operation to individual preferences. Normally, the motor should rotate at, or be geared to produce, speeds of from 30 to 10 revolutions per minute since that will cause the mirror to make one sweep every 1 to 3 seconds, respectively (assuming two sweeps per revolution of the motor). Although variations in the arc of oscillation will dictate different oscillation rates, a sweep time of about 2 seconds will often be found to be most satisfactory. As has been mentioned previously, the motor will conveniently draw power directly from the battery of the vehicle with which it is employed. Nevertheless, it may be desirable in some instances to provide a separate source of power for the device, in which case the base may be adapted to house one or more dry cell batteries. Since the scan action of the device will not generally be helpful or necessary under normal driving conditions, the line switch may simply be of the single pole, single throw type for on-off control, to activate the device during parking or maneuvering and to render it inoperative during periods of normal driving. It may also include a rheostat or other means to vary the current to the motor for speed control.

Although the device has been illustrated and described herein in connection with vehicular applications, and in circumstances in which mounting for oscillation of the mirror about a vertical axis is most appropriate, it should be appreciated that it may have other uses and may be otherwise mounted. Description in connection with vehicles has been to emphasize the preferred embodiments, and should not be construed to impose any undue limitation upon the scope of the invention.

Thus, it can be seen that the present invention provides a novel device having a motor driven mirror mounted for oscillation to extend the field of vision which would otherwise be afforded thereby. More specifically, the device may be adapted for mounting upon a vehicle to oscillate about a generally vertical axis to provide a broadened field of vision in a generally rearward direction. The device is relatively simple and inexpensive to manufacture, and it operates in a convenient and highly effective manner.

Having thus described the invention, I claim:

1. In an oscillatory mirror device, the combination comprising: a supporting base; a mirror assembly mounted upon said base for pivotal movement about an axis, said mirror assembly including a mirror supported upon a pivotable post which extends along said pivotable axis; an electric motor providing rotary drive power and disposed within a chamber of said base with its drive shaft extending parallel to said axis of pivotable movement of said mirror assembly in spaced relationship to said pivotable post thereof; and drive train means for transmitting power from said motor to said mirror assembly and for converting rotary movement from said motor to oscillatory movement of said mirror assembly, said drive train means comprising a crank secured to said motor shaft and having engagement means spaced radially therefrom and a link member fixedly secured to said post of said mirror assembly, said link member having an elongated slot therein in which said engagement member of said crank is slidably engaged, said slot being dimensioned and configured to constrain said engagement member to sliding movement along the axis thereof, said mirror assembly being constrained by said drive train means to oscillation through an arc of less than about 90 degrees about said axis of pivotal movement to scan a limited field of vision during operation of said device.

2. The device of claim 1 wherein said motor rotates at a speed of about 15 to 20 revolutions per minute.

3. The device of claim 1 additionally including a mounting bracket adapted for affixation to a vehicle body with said pivotal axis of said mirror assembly substantially vertical.

4. The device of claim 1 wherein said pivotable post is disposed adjacent the midpoint of the horizontal dimension of said mirror.

* * * * *